United States Patent
Lazzi et al.

(10) Patent No.: US 10,161,779 B2
(45) Date of Patent: Dec. 25, 2018

(54) LIQUID LEVEL SENSOR MEASURING A CHARACTERISTIC INDICATIVE OF INDUCTIVE COUPLING

(71) Applicant: University of Utah Research Foundation, Salt Lake City, UT (US)

(72) Inventors: Gianluca Lazzi, Salt Lake City, UT (US); Dulce Altabella Lazzi, Salt Lake City, UT (US); Anil Kumar Ram Rakhyani, Salt Lake City, UT (US); Kyle Loizos, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 55 days.

(21) Appl. No.: 15/166,053

(22) Filed: May 26, 2016

(65) Prior Publication Data
US 2016/0349095 A1  Dec. 1, 2016

Related U.S. Application Data

(60) Provisional application No. 62/230,090, filed on May 26, 2015, provisional application No. 62/258,904, filed on Nov. 23, 2015.

(51) Int. Cl.
*G01F 23/00* (2006.01)
*G01F 23/24* (2006.01)
*G01F 23/26* (2006.01)

(52) U.S. Cl.
CPC .......... *G01F 23/241* (2013.01); *G01F 23/248* (2013.01); *G01F 23/261* (2013.01); *G01F 23/268* (2013.01)

(58) Field of Classification Search
None
See application file for complete search history.

(56) References Cited

U.S. PATENT DOCUMENTS

| | | | |
|---|---|---|---|
| 4,497,205 A | 2/1985 | Zulauf et al. | |
| 6,028,521 A | 2/2000 | Issachar | |
| 6,192,752 B1 | 2/2001 | Blaine | |
| 6,212,959 B1 | 4/2001 | Perkins | |
| 6,474,156 B1 * | 11/2002 | Endo | B41J 2/17513 340/618 |

(Continued)

FOREIGN PATENT DOCUMENTS

EP    2051049 A1    4/2009

*Primary Examiner* — Jermaine Jenkins
(74) *Attorney, Agent, or Firm* — Thorpe North & Western, LLP

(57) ABSTRACT

A sensor for determining liquid level in a liquid reservoir can include a primary inductor and a secondary inductor to be associated with sides of the reservoir that changes shape as a volume of liquid changes or is displaced within the liquid reservoir. The sensor can include an electrical power source to inductively couple the primary inductor and the secondary inductor. The liquid level sensor can include an inductive coupling measurement device associated with the primary inductor and/or the secondary inductor to measure a characteristic indicative of the inductive coupling of the primary inductor and the secondary inductor (e.g., a distance between inductors). As liquid volume changes and the reservoir deforms, the inductors move relative to each other and a voltage change occurs to determine a liquid level in the reservoir. A sensor kit is provided.

20 Claims, 4 Drawing Sheets

(56) References Cited

U.S. PATENT DOCUMENTS

| | | |
|---|---|---|
| 6,558,537 B1 | 5/2003 | Herrington et al. |
| 6,677,859 B1 | 1/2004 | Bensen |
| 6,840,100 B1 | 1/2005 | Wotiz |
| 6,990,860 B1 * | 1/2006 | Gillanders ................ A45F 3/20 |
| | | 222/175 |
| 7,284,427 B2 | 10/2007 | Calabrese |
| 7,600,423 B1 * | 10/2009 | Fluhler .................. G01F 23/26 |
| | | 73/290 B |
| 8,196,466 B2 | 6/2012 | Beneker et al. |
| 8,387,831 B2 | 3/2013 | McInerney |
| 8,905,330 B2 | 12/2014 | Paukovits et al. |
| 9,663,343 B2 * | 5/2017 | Veldhi .................. F25D 23/126 |
| 2005/0046419 A1 * | 3/2005 | Nicolazo de Barmon ................. |
| | | B22D 2/003 |
| | | 324/229 |
| 2012/0255353 A1 | 10/2012 | Kozaki et al. |
| 2014/0088556 A1 | 3/2014 | Makaveev et al. |
| 2014/0311239 A1 | 10/2014 | Marjanovic et al. |
| 2014/0361101 A1 | 12/2014 | Maher |
| 2015/0059466 A1 | 3/2015 | Adlon |

\* cited by examiner

LIQUID LEVEL SENSOR MEASURING A CHARACTERISTIC INDICATIVE OF INDUCTIVE COUPLING

RELATED APPLICATIONS

This application claims priority of U.S. Provisional Application No. 62/230,090, filed May 26, 2015, and U.S. Provisional Application No. 62/258,904, filed Nov. 23, 2015, which are incorporated herein by reference.

GOVERNMENT INTEREST

None.

BACKGROUND

Endurance activities, such as mountain biking, long-distance running, ski touring, hiking, and military operations can be strenuous. Therefore, proper and continuous hydration is an important consideration for individuals during such activities. Hydration systems have been developed to address this need. Typical hydration systems include specialized backpacks equipped with a flexible bladder and a drinking tube so that a sufficient amount of water can be carried and consumed efficiently. With typical hydration systems, the precise amount of water remaining in the bladder during an activity is unknown, leading to potentially inconvenient or dangerous situations. Currently, the amount of water remaining is determined by "experience" (e.g., feeling the weight), by inspection (e.g., visually checking the bladder), or by using a commercially available flowmeter. These approaches each have drawbacks. For example, the weight of the hydration pack felt by the user may not necessarily indicate the amount of liquid remaining in the bladder, as hydration packs often are used to carry gear related to the outdoor activity, which may vary in weight from one excursion to the next. Inspecting the bladder may provide the user with a sure indication of the amount of liquid remaining, however, such inspections require stopping the activity and opening the hydration pack, which is often inconvenient. Although flowmeters do provide some indication of the amount of liquid consumed, the current commercial offerings have reliability and accuracy issues due to their designs.

SUMMARY

A liquid level sensor is disclosed herein that can provide accurate, real-time indications of the liquid level in a hydration pack bladder, or in another liquid holding, flexible container. The liquid level sensor can include a primary inductor and a secondary inductor positionable on either sides of a flexible reservoir. For example, the primary inductor may be positionable adjacent a first side of a reservoir and the second inductor may be positionable adjacent an opposing, second side of the reservoir. Thus, the inductors are spatially separated from each other in this configuration such that liquid may be disposed therebetween. The liquid level sensor can also include an electrical power source electrically coupled to the primary inductor to provide current to the primary inductor to inductively couple the primary inductor and the secondary inductor. The liquid level sensor can include an inductive coupling measurement device associated with at least one of the primary inductor and the secondary inductor to measure a characteristic indicative of the inductive coupling of the primary inductor and the secondary inductor. A change in volume of the liquid (or even displacement of the liquid) in the flexible reservoir can cause a change in distance between the primary inductor and the secondary inductor, which can cause a change in the inductive coupling of the primary inductor and the secondary inductor such that measurement of the characteristic indicative of the inductive coupling facilitates determining a liquid level in the flexible reservoir.

A kit for measuring and providing liquid level in a reservoir includes at least one panel having a primary side and a secondary side. The panel is positionable around or about the reservoir capable of containing a liquid. In some cases, the panel can be flexible to allow conformity with sides of the reservoir. Alternatively, the panel can be rigid to provide structural reinforcement and shape to the reservoir. A plurality of primary inductors may be attached to the primary side. A plurality of secondary inductors may be attached to the secondary side and opposing the primary side of the reservoir such that the primary inductors are spatially separated from the secondary inductors. An energy source may be electrically coupled to at least one of the primary inductors to inductively couple the primary inductor(s) to the secondary inductor(s). A measurement device may be electrically coupled and associated with at least one of the primary inductors and the secondary inductors to measure a characteristic of the inductive coupling (e.g., a distance between) of at least one of the primary inductors and at least one of the secondary inductors.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
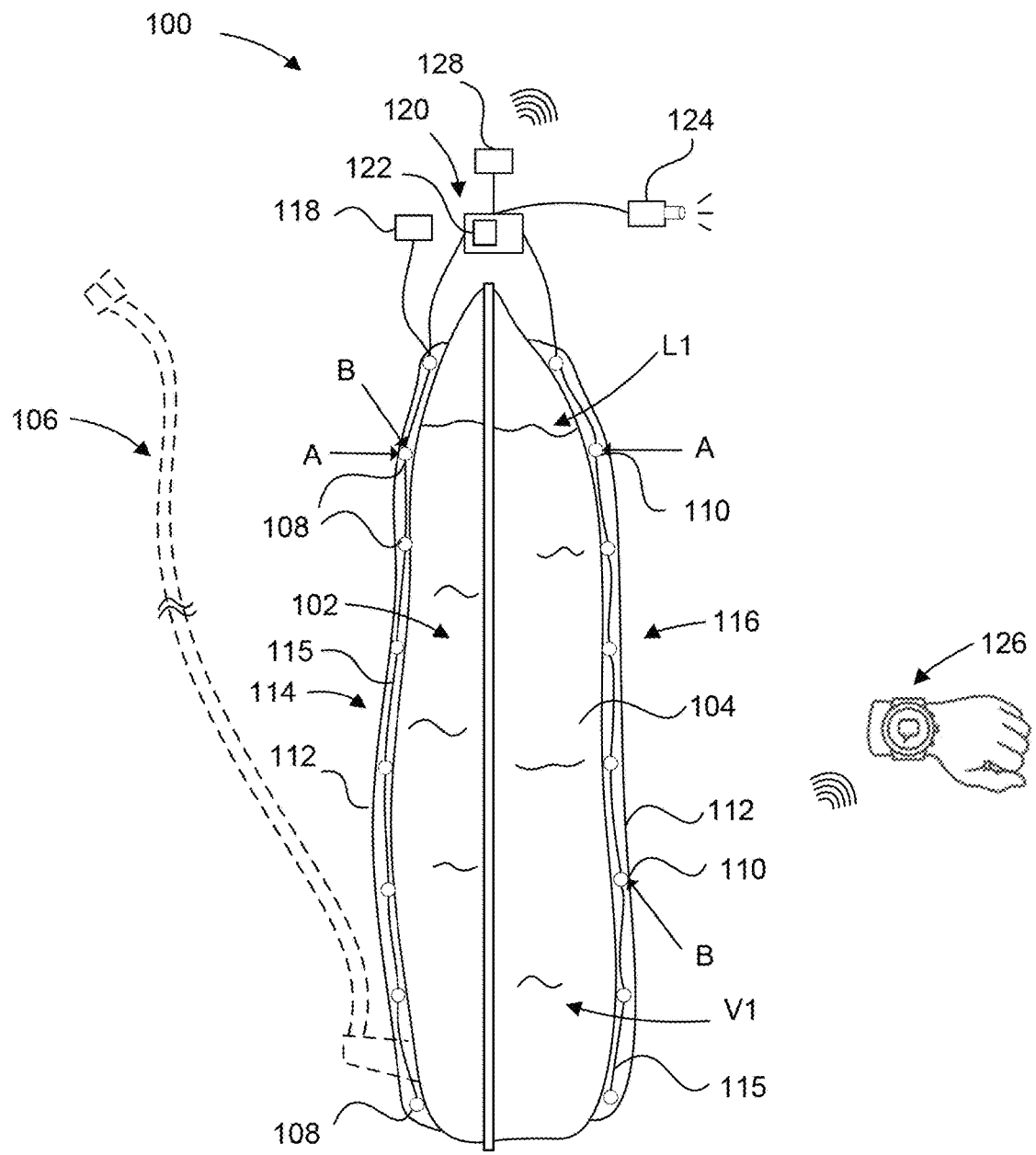
FIG. 1 is a schematic illustration of a liquid level sensor system in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "an inductor" includes reference to one or more of such features and reference to "inductively coupling" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Liquid Level Sensor

FIG. 1 illustrates a liquid level sensor system 100 in accordance with an example of the present disclosure. The liquid level sensor system 100 ("system" or "sensor") can include a flexible reservoir 102 that can hold or contain a liquid 104. The flexible reservoir 102 can be a hydration system bladder, IV bag, feeding bags, industrial supply, or any other flexible, collapsible fluid container. The flexible reservoir 102 can be made of any suitable flexible and water-tight material, such as any suitable polymer known in the art. Non-limiting examples of suitable polymers can include polyester, thermoplastic polyurethane (TPU), polyethylene, polypropylene, thermoplastic elastomers, polyethylene vinyl acetate, copolymers thereof, composites thereof, and the like. The flexible reservoir 102 can therefore change shape as a volume of the liquid changes within the flexible reservoir 102. Alternatively, the reservoir can be a rigid reservoir which can be reinforced to avoid deformation and to maintain a desired form factor. Regardless, the reservoir can be formed of similar suitable polymers which are more highly crosslinked or are chosen with a higher rigidity (e.g. polycarbonate, ABS, etc). Thus, discussion herein regarding a "flexible" reservoir can also generally be applied to rigid reservoirs.

The flexible reservoir 102 may have attached thereto a fluid conduit 106 fluidly coupled to the reservoir 102 at a lower area, as shown by the dashed lines. The fluid conduit 106 may be traversed through a backpack and/or over a shoulder of a user for dispensing of the liquid. In many cases, the fluid conduit 106 can be fluidly coupled to the flexible reservoir at an inlet end and can have a mouthpiece valve at an opposite outlet end.

The liquid level sensor system 100 can have a primary inductor 108 and a secondary inductor 110. The inductors 108 and 110 may be coupled (or otherwise attached) to a panel(s) 112 positionable around (or on either side) of the reservoir 102 or may be directly affixed (not shown) to surfaces of the reservoir 108. In some examples, the primary inductors 108 and/or secondary inductors 110 can be located externally about the reservoir, or internally in the reservoir (i.e., on an internal surface), and/or disposed within a wall of the reservoir (e.g., molded into a plastic wall). In an example with a rigid reservoir, so long as coupling between inductors is affected (e.g. two rigid surfaces that are allowed to get further or closer to each other through a hinge, combination of rigid and flexible portions, or similar mechanism). For purposes of this disclosure, the primary inductor 108 may be a single inductor or a plurality of inductors; likewise, the secondary inductor 110 may be one or more inductors 110. In the example of FIG. 1, the primary inductor 108 includes a plurality of primary inductors 108 associated with, and positioned adjacent, a primary side 114 of the reservoir 102. Likewise, the secondary inductor 110 includes a plurality of secondary inductors 110 associated with, and positioned adjacent, a secondary side 116 such that the primary inductors 108 oppose the secondary inductors 110 about the reservoir 102 and the liquid 104 disposable therein. Each set of inductors may be a strip of individual inductors connected by electrical wires 115, for example. The sets of inductors can be positioned on any suitable location about the reservoir such that a volume of liquid is positionable between the sets of inductors. The number of inductors can vary considerably but can, in principle, range from two to several thousand, and often from about six to fifty. The primary and secondary inductors can be any suitable type of inductor, such as an electrically conductive coil. The inductors can generally be wound conductive coils with any number of turns, either flat or with multiple layers, constructed using metallic wire or conductive thread that is woven or threaded into a panel attached to the reservoir. Although various inductors may be suitable, non-limiting examples of commercially available inductors include wire-wound fixed inductors, solenoids, or bifilar coils.

The system 100 may have an electrical power source 118 to provide current to the primary inductor 108 to inductively couple the primary inductor(s) 108 and the secondary inductor(s) 110. The electrical power source 118 can include any suitable type of power source, such as a voltage source, and/or a current source, etc. In one aspect, the electrical power source 118 can provide current as a pulse, and/or a waveform. Typically, the electrical power source 118 can be connected via suitable electrical power source contacts. Such contacts can include, but are not limited to, battery contacts, plugs, and the like. Thus, the electrical power source contacts can include a connector adapted to connect to an electrical power source which provides current as a pulse, a waveform, or a combination thereof. In some examples, electrical power can be supplied by a user, such as through a mobile device, portable solar panel, or other external device capable of supplying power to the system. However, removable or rechargeable batteries can be used as the electrical power source 118 and can be housed within the coupling measurement device 120 or another suitable housing.

The system 100 can have an inductive coupling measurement device 120 associated with the primary inductor 108 and/or the secondary inductor 110 to measure a characteristic indicative of the inductive coupling of the primary inductor 108 and the secondary inductor 110. Two inductors are referred to as mutual-inductively coupled or magnetically coupled (i.e., formed an inductive link) when they are configured such that a change in current through one inductor induces a voltage across the other inductor through electromagnetic induction. The amount of inductive coupling between two inductors can be measured by their mutual inductance. The inductive coupling measurement device 120 can be any suitable type of device that can be used to measure or derive an absolute or relative degree of inductive coupling between the primary and secondary inductors. For example, the inductive coupling measurement device 120 can include a voltage sensor, a current sensor, an inductance sensor, and/or a capacitance sensor, etc. Accordingly, the characteristic indicative of the inductive coupling measured by the inductive coupling measurement device 120 can include voltage, current, inductance, and/or capacitance, etc. The characteristic indicative of the inductive coupling can be measured in the primary and/or secondary inductors. In one aspect, the electrical power source can provide current to a series of primary inductors simultaneously or in sequence to facilitate measuring the characteristic indicative of the inductive coupling in one or more secondary inductors.

In one example of measuring a liquid volume V1 and/or liquid level L1 in a flexible reservoir 102, the liquid level sensor 100 can measure any suitable parameters involved in inductive coupling across the flexible reservoir 102. For example, electrical current can be applied to the primary inductor 108 (e.g., the uppermost labeled inductor 108), thereby generating a magnetic field. This magnetic field then induces current in the secondary inductors 110 (e.g., the two labeled inductors 110). The measurement device 120 can then measure the voltage across the secondary inductors 110 on the receiving side. The closer the secondary inductors 110 are to the primary inductor 108 creating the magnetic field, the higher the voltage reading. This can provide a stable, accurate method for measuring liquid level L1 and/or volume V1 in the reservoir 102. For example, a distance between arrows A-A (i.e., the distance between a respective primary inductor 108 and respective secondary inductor 110) can be determined by the measurement device 120 in the manner described above. Likewise, a distance between arrows B-B can also be determined by the measurement device 120 to determine the distance between respective inductors to determine the amount of liquid remaining in the reservoir. Similarly, a plurality of distances can be calculated between the pluralities of the primary inductors 108 and secondary inductors 110.

The liquid level sensor 100 can include an indicator 124 to indicate the liquid and/or volume level to a user and/or device. The indicator 124 can include any suitable type of indicator, such as a visual indicator, an audible indicator, and/or a haptic indicator, etc. For example, the liquid level sensor 100 can utilize a visual indicator (e.g., LED) to provide immediate and accurate reading of the liquid level remaining in a reservoir without need to stop the activity or guess as to the amount of liquid remaining. The liquid level sensor 100 can also include a wireless transmitter 128 operatively connected to the inductive coupling measurement device 120 and adapted to communicate wirelessly with an external indicator 126. In one aspect, the external indicator can comprise a smart watch 126, a fitness band, a smart phone, and/or a personal electronic device, etc. For example, data regarding the amount of fluid intake by a user (e.g., based on the fill level of a hydration pack) can be sent to an application on smartphones or smart watches via low power communication methods, such as ANT+ and Bluetooth Low Energy. This data can be used to log fluid intake, and sync with activity apps, such as MapMyFitness, Nike+, and Apple Health, to provide suggestions for hydration and nutrition for the specific user (e.g., incorporating age, frequency of activity, prior hydration, heart rate, activity type, etc.). As such, devices with integrated wireless communication may also serve as the indicator for the volume of fluid remaining in the reservoir, allowing smart watch, smart phone, and fitness band users to use their existing device rather than adding an additional indicator. Such capabilities may be beneficial to outdoor enthusiasts (e.g., hikers, bikers, skiers, etc.) and military personnel, who need to ensure that they have the proper level of hydration available to them at any given time.

In one optional aspect, the system 100 can include a buffer register 122 which stores inductance and/or volume data. This data can be used to calculate an average or buffered volume indication over time. For example, due to impacts or abrupt changes in shape of the reservoir 102 the sensor may register volume changes which are not accurate. Accordingly, a buffer register 122 can be used to collect data over a predetermined period of time which can then be used to calculate an average volume. The averaged period of time may vary from about 2 seconds to 1 minute, although other buffering times can be useful.

Figure 2:
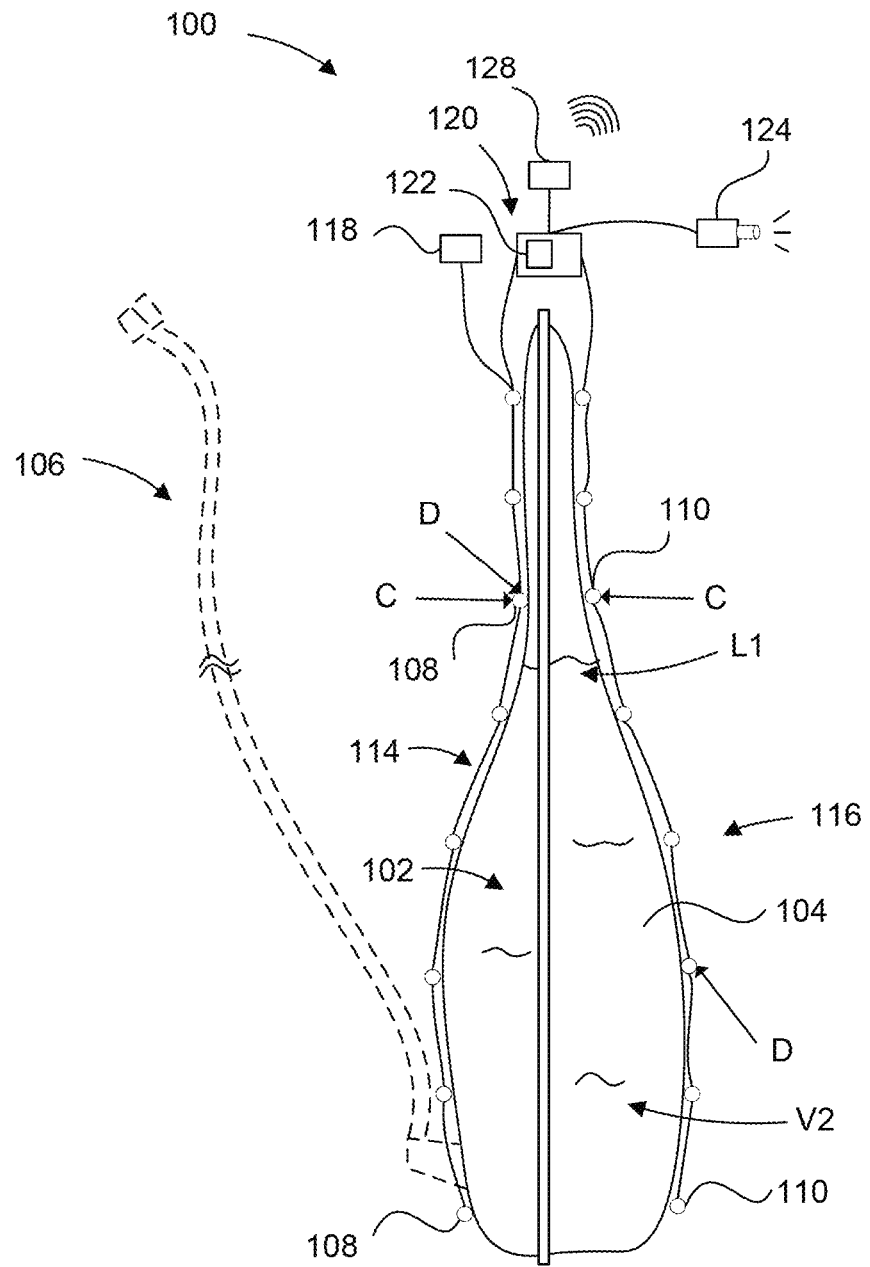
FIG. 2 is a schematic illustration of a liquid level sensor system in accordance with an example of the present disclosure.

FIG. 2 shows the sensor system 100 of FIG. 1 with the flexible reservoir 102 being in a semi-collapsed state and having a volume V2 and liquid level L2 (the panel 112 is removed for clarity). Thus, FIG. 2 illustrates that the reservoir 102 now has less volume of liquid as compared to that of FIG. 1 (i.e., a user consumed some of the liquid via the conduit 106). Therefore, the reservoir 102 has changed shape or deformed, resulting in a change in distance between one or more opposing inductors, which thereby changes the some or all of the voltage readings between said inductors in order to calculate the liquid remaining in the reservoir. For example, a distance between arrows C-C is now shorter than the distance of arrows A-A of FIG. 1, which can be determined and used by the measurement device 120 to determine the level L2 and/or volume V2 of liquid remaining in the semi-collapsed reservoir 102 of FIG. 2. Likewise, a distance between arrows D-D is shorter than the distance of arrows B-B of FIG. 1, which can also be determined and used by the measurement device. The new liquid level and/or liquid volume can then be indicated by an indicator 124, and/or transmitted wirelessly to a device, as described in the present disclosure. This approach accommodates for vertical and horizontal positioning of the reservoir due to the orientation of the coils changing along with the distance between them, which will have an effect on the coupling. Liquid level measurements can also be taken by applying a voltage pulse, a series of pulses, or a waveform to the primary inductors on one side of the flexible reservoir 102, and reading the induced voltage in resonating secondary inductors 110 on another side of the reservoir 104, or by recording the reflected impedance at the receiving secondary inductors 110.

Figure 3:
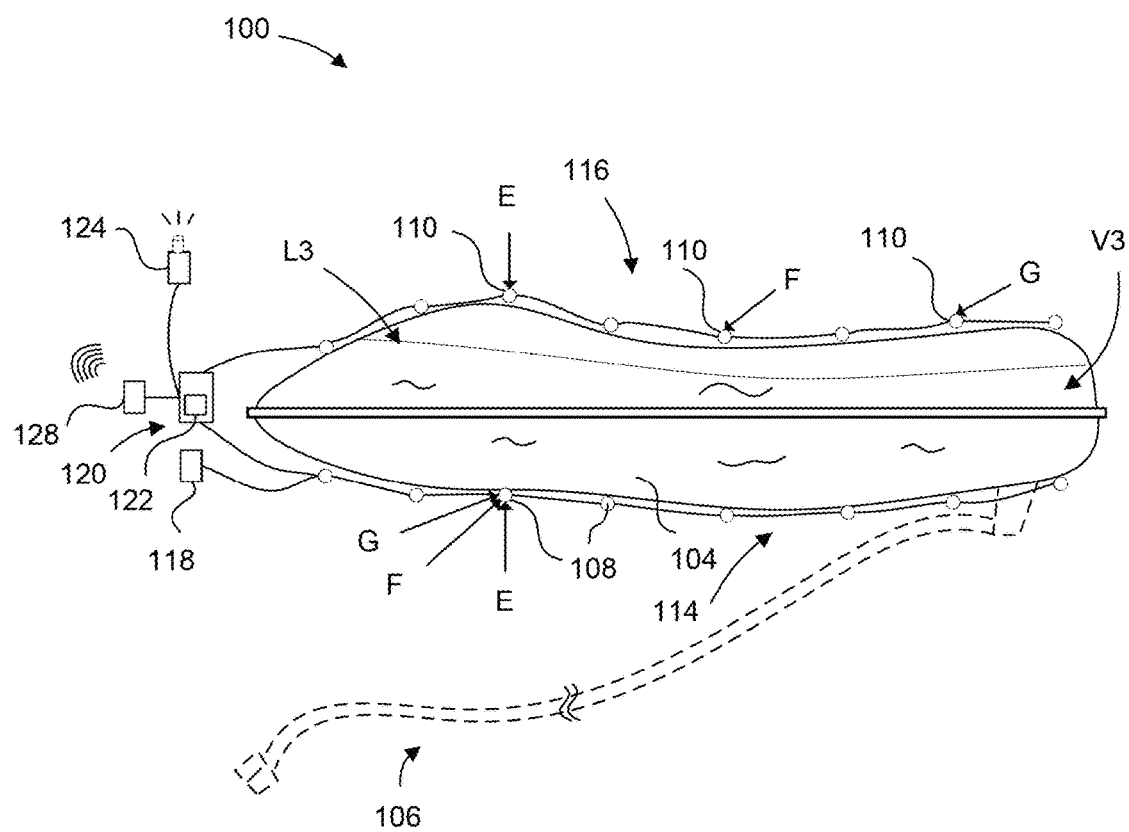
FIG. 3 is a schematic illustration of a liquid level sensor system in accordance with an example of the present disclosure.

FIG. 3 shows the sensor system 100 of FIG. 1 with the flexible reservoir 102 being substantially horizontal to ground level, for example, and having a volume V3 of liquid 104 at a liquid level L3. Therefore, a change in distance occurred between one or more inductors. Here, the liquid may have been merely displaced, thereby deforming the reservoir as compared to the shape of FIG. 1. In certain applications, a user may be lying down for long periods of time, or getting up and down frequently, or be hunched over. In any event, liquid in a reservoir on a user's back may be constantly moving around or being displaced throughout the reservoir, as illustrated in FIG. 3. In existing sensor systems, faulty liquid levels are often provided to the user because of this constant movement of liquid and/or because the liquid may be in a substantially horizontal manner with a reservoir.

As illustrated by FIG. 3, in the sensor system 100 described in the present disclosure the measurement of the liquid level L3 or volume V3 is much more accurate than existing systems as the liquid moves around because a variety of distances can be determined between opposing inductors irrespective of the position or movement of the reservoir. For example, an average or sum of voltages among inductors can be determined and correlated with a corresponding volume. Thus, individual changes in inductor distances due to local flexing particular inductor pairs results in a net volume which closely reflects actual volume (e.g. some would read lower while others read higher). In one example, by configuring inductors in series, the resulting voltage measurement is a sum of voltages through each inductor coil. Similarly, in order to avoid temporary errors, recorded voltages can be averaged over a period of time (e.g. a few seconds to several minutes). This is particularly advantageous over existing systems that merely use conductive strips on one side of a bladder, or magnets that tend to pinch the bladder, for instance. In FIG. 3, for example, a distance between arrows E-E can be determined by the measurement device 120 in the manner described above. Likewise, a distance between arrows F-F and a distance between arrows G-G can both be determined by the measurement device 120 to determine the liquid level L3 and/or liquid volume V3 of liquid remaining in the reservoir 102. Thus, regardless of the type of liquid in the reservoir and regardless of the position of the reservoir relative to horizontal, the system 100 can provide accurate liquid levels to users due to the particular configuration of the inductors of the sensor. In examples where the register 122 is used, inductance and/or volume data of the inductors of FIG. 3 can be used to calculate an average or buffered volume indication over time, as further discussed above.

Figure 4:
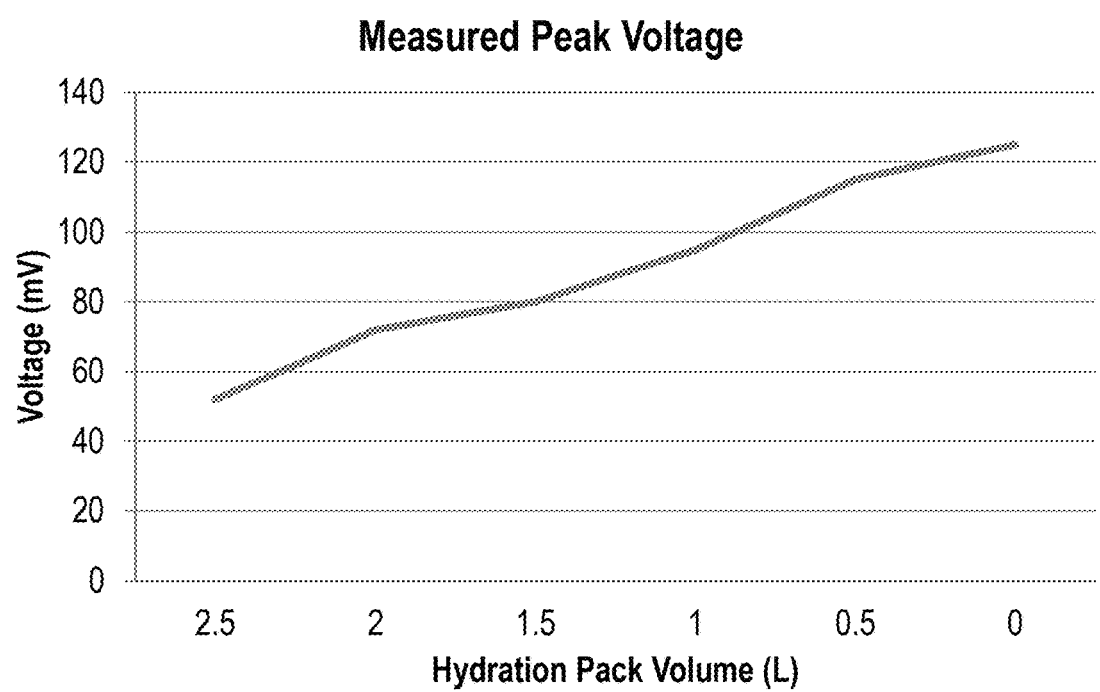
FIG. 4 is a graph of voltage versus liquid volume in a flexible reservoir in accordance with an example of the present disclosure.

FIG. 4 is a graph of voltage versus liquid volume in a flexible reservoir, such as the reservoir 102 of FIGS. 1-3. As the volume of liquid reduces in a flexible reservoir, voltage increases due to the inductive coupling characteristic of the inductors moving closer relative to each other, which thereby allows a measurement device to calculate the volume and/or level of liquid. The level and/or volume can then be indicated to the user, as discussed in the present disclosure.

Because the liquid level sensor of the present disclosure utilizes inductance and not capacitance, for example, the sensor 100 is less sensitive to material than capacitive sensors and can therefore provide more accurate determinations of fill level. A capacitive sensor is sensitive to the liquid in the reservoir because capacitance is directly proportional to dielectric constant. Thus, the reading will be not only dependent upon the distance between capacitive sensor pads, but also on the type of liquid in the reservoir (e.g., a sports drink vs. water) and whether the liquid moves inside the reservoir, which can provide an unstable reading. In contrast, for a liquid level sensor of the present disclosure the movement of liquid inside the reservoir is irrelevant when the liquid is not ferromagnetic (i.e., transparent to magnetic fields), as is typically the case with liquids consumed by humans. Thus, the dielectric properties of the liquid, liquid splashing, or other variation within the inter-coil medium will not vary the readings of a liquid level sensor in accordance with the present disclosure. Additional optional smaller coils in series can increase accuracy of readings.

The examples discussed with reference to FIGS. 1-4 could be provided to a user as a kit for measuring and providing liquid level in a reservoir. For example, and with reference to FIG. 1 in particularly, the kit may include a panel(s) 112 having a primary side 114 and a secondary side 116 such that the panel 112 is positionable about (or retrofitted to) a reservoir 102 capable of containing a liquid 104. The panel(s) can be flexible to allow conformity with the reservoir. However, in some cases the panel(s) can be rigid to provide structural form and reinforcement to the reservoir. A plurality of primary inductors 108 may be attached to the primary side 114 of the panel 112. A plurality of secondary inductors 110 may be attached to the secondary side 116 and opposing the primary side 114 of the reservoir 102 such that the primary inductors are spatially separated from the secondary inductors 110. The kit may include some or all of the features discussed with reference to the Figures, such as incorporation of the energy source, measurement device, wireless transmitter, indicator, etc.

In one example of a kit, the inductors can be secured to an exterior surface of a reservoir using an adhesive or a more easily removable attachment, such as a hook and loop fastener (e.g. VELCRO). In addition, the inductors may be incorporated into a sock or band that can encompass a reservoir, which can include a non-slip surface and stretchable material to maintain secure placement of the coils against the surface of the reservoir. For a more permanent attachment, the inductors can be incorporated and integrated into the reservoir material (e.g., formed with the flexible plastic of the reservoir). The electrical power source can include or be coupleable to a battery, capacitor, or any other suitable energy source. A kit can be applied to a reservoir without the need to permanently alter the reservoir or drinking tube. Thus, the kit modification made to the bladder can be reversible and removable.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A liquid level sensor, comprising:
    a primary inductor positionable adjacent a first side of a liquid reservoir and a secondary inductor positionable adjacent an opposing second side of the liquid reservoir such that the inductors are spatially separated from each other;
    electrical power source contacts electrically coupled to at least one of the primary inductor and the secondary inductor to inductively couple the inductors to each other; and
    an inductive coupling measurement device associated with at least one of the primary inductor and the secondary inductor to measure a characteristic indicative of the inductive coupling of the primary inductor and the secondary inductor,
    wherein displacement of a liquid in the reservoir causes the reservoir to change shape, which thereby causes a change in distance between the primary inductor and the secondary inductor, which causes a change in the inductive coupling of the primary inductor and the secondary inductor such that measurement of the characteristic indicative of the inductive coupling permits determining a liquid level in the reservoir.

2. The liquid level sensor of claim 1, wherein the inductive coupling measurement device comprises a voltage sensor, a current sensor, an inductance sensor, a capacitance sensor, or a combination thereof.

3. The liquid level sensor of claim 1, wherein the characteristic indicative of the inductive coupling comprises voltage, current, inductance, capacitance, or a combination thereof.

4. The liquid level sensor of claim 1, wherein the characteristic indicative of the inductive coupling is measured in the secondary inductor.

5. The liquid level sensor of claim 1, wherein the inductive coupling measurement device determines a distance between the primary inductor and the secondary inductor to determine a liquid level.

6. The liquid level sensor of claim 1, wherein the liquid reservoir is a flexible reservoir.

7. The liquid level sensor of claim 1, further comprising an indicator to indicate the liquid level to a user.

8. The liquid level sensor of claim 7, wherein the indicator comprises a visual indicator, an audible indicator, a haptic indicator, or a combination thereof.

9. The liquid level sensor of claim 7, further comprising a wireless transmitter operatively connected to the inductive coupling measurement device and adapted to communicate wirelessly with the indicator.

10. The liquid level sensor of claim 9, wherein the indicator comprises a smart watch, a fitness band, a smart phone, a personal electronic device, or a combination thereof.

11. The liquid level sensor of claim 1, wherein a predetermined quantity of the characteristic indicative of the inductive coupling indicates a relative position of the liquid level and the primary and secondary inductors.

12. The liquid level sensor of claim 1, wherein the primary inductor and the secondary inductor each comprise a plurality of inductors, wherein the inductors are spaced apart from one another on the respective sides of the liquid reservoir in a direction that corresponds to a changing liquid level of the reservoir such that, as a volume of liquid changes, a distance change occurs between some or all of the primary inductors and the secondary inductors.

13. The liquid level sensor of claim 12, wherein the liquid level is determined by a comparison of the characteristic indicative of the inductive coupling measured in at least two of the secondary inductors.

14. The liquid level sensor of claim 12, wherein the electrical power source provides current to the primary inductors in sequence to facilitate measuring the characteristic indicative of the inductive coupling in the secondary inductors.

15. The liquid level sensor of claim 12, further comprising a buffer register coupled to at least one of the primary sensor or the secondary sensor, the register configured to gather inductance or liquid volume data to calculate an average liquid volume indication during a predetermined time period.

16. A liquid level sensor system, comprising:
    a liquid reservoir that changes shape as a volume of liquid changes therein; and
    a liquid level sensor having:
        a primary inductor and a secondary inductor, the inductors spatially separated from each other on either side of the reservoir and coupled to the liquid reservoir; and
        an inductive coupling measurement device coupled to the primary inductor to determine a distance between the primary inductor and the secondary inductor upon powering one of the inductors, such that the measurement device calculates a level or volume of liquid in the reservoir.

17. The liquid level sensor system of claim 16, wherein the primary inductor includes a plurality of primary inductors and the secondary inductor includes a plurality of inductors, wherein the primary inductors are spatially separated from and opposing the secondary inductors about sides of the reservoir, whereby a change in volume of the liquid in the reservoir causes a change in distance between some or all of the primary inductors and the secondary inductors such that the measurement device determines a level or volume of liquid remaining in the reservoir.

18. The liquid level sensor system of claim 16, further comprising a power source electrically coupled to one or both of the inductors.

19. A kit for measuring and providing liquid level in a reservoir, the kit comprising:
    a panel having a primary side and a secondary side, the panel positionable about a reservoir;

a plurality of primary inductors attached to the primary side;

a plurality of secondary inductors attached to the secondary side and opposing the primary side of the reservoir such that the primary inductors are spatially separated from the secondary inductors; and a measurement device associated with at least one of the primary inductors and the secondary inductors to measure a characteristic indicative of inductive coupling of at least one of the primary inductors and at least one of the secondary inductors and to determine therefrom a distance between at least one of the primary inductors and at least one of the secondary inductors upon application of energy to at least one of the primary inductors to determine a liquid level in the reservoir.

20. The kit of claim 19, wherein removal of the liquid in the reservoir causes the reservoir to change shape, which thereby causes a change in distance between at least one primary inductor and at least one secondary inductor such that the measurement device facilitates determining a liquid level in the reservoir.

* * * * *